UNITED STATES PATENT OFFICE.

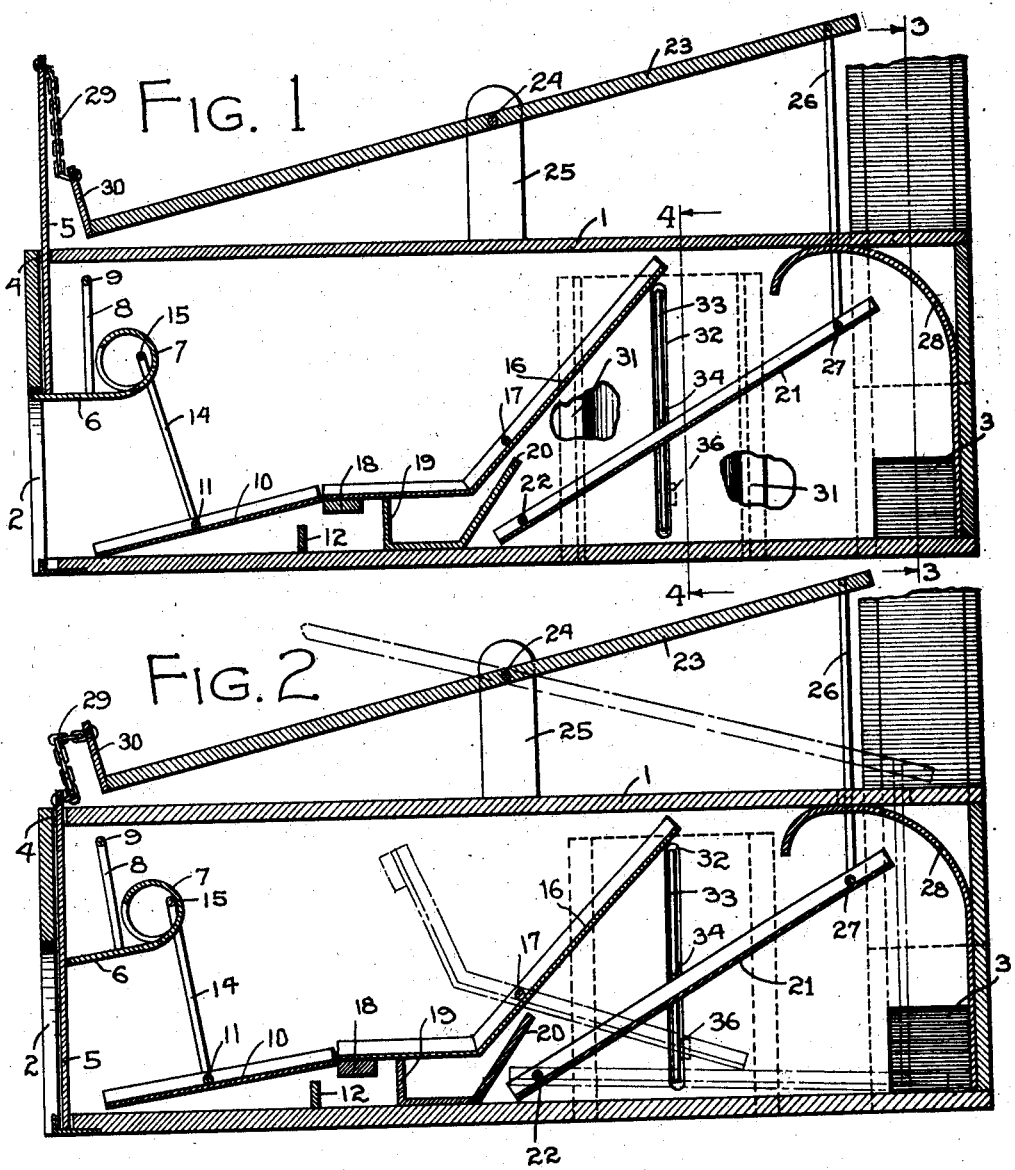

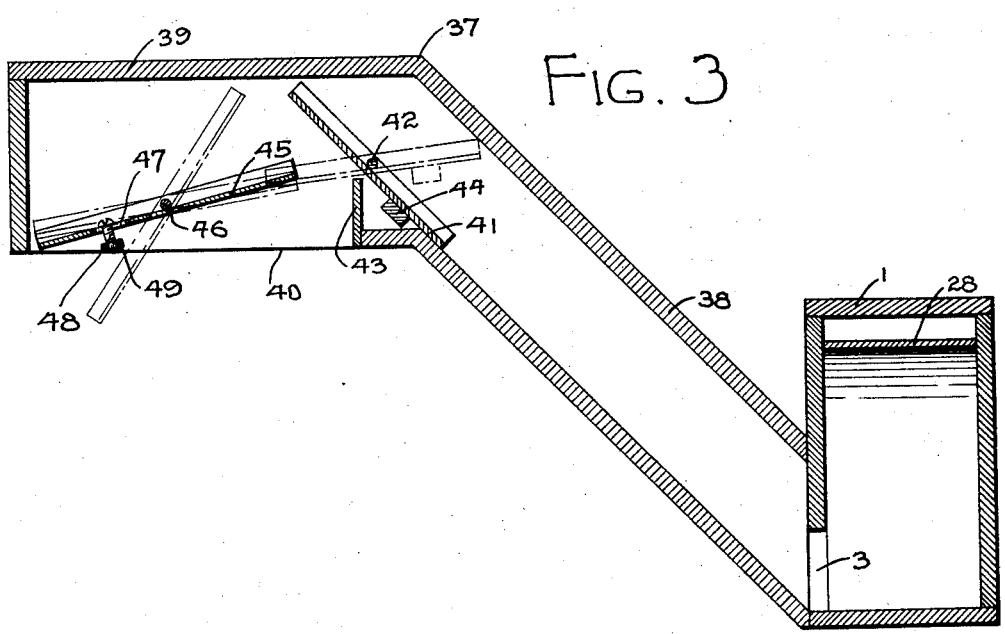
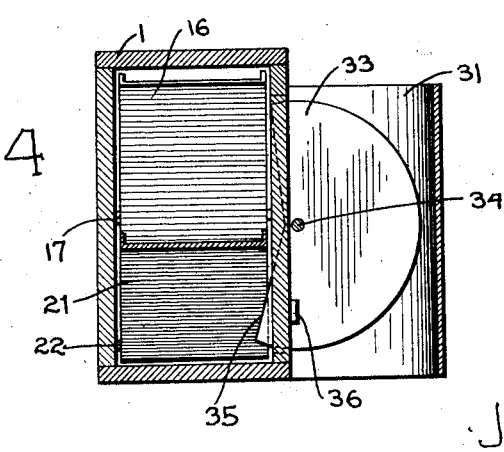

JOSEPH FRITSCH, OF SEDRO WOOLLEY, WASHINGTON.

RAT OR ANIMAL TRAP.

1,392,008.  Specification of Letters Patent.  Patented Sept. 27, 1921.

Application filed August 25, 1920. Serial No. 405,831.

*To all whom it may concern:*

Be it known that I, JOSEPH FRITSCH, a citizen of the United States, residing at Sedro Woolley, in the county of Skagit and State of Washington, have invented a new and useful Rat or Animal Trap, of which the following is a specification.

The device forming the subject matter of this application is a trap of that general type shown in my prior Patent No. 1,093,691, granted on April 21, 1914.

The present invention contemplates sundry improvements in the trap above alluded to, to wit, first, the provision of novel means whereby it will be rendered impossible for an animal in the trap to pull down one of the platforms and make his escape.

Another object of the invention is to provide novel means for disposing of the animal after the animal has left the main casing portion of the trap.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a trap constructed in accordance with the invention, parts being broken away, the trap being set; Fig. 2 is a similar view, the parts being shown in solid lines as they will appear after the animal has worked a lowering of the entrance doors, and before the animal has proceeded through the trap; Fig. 3 is a section taken approximately on the line 3—3 of Fig. 1; and Fig. 4 is a cross section taken approximately on the line 4—4 of Fig. 1.

The numeral 1 denotes an elongated box-like casing provided at one end with an entrance opening 2, and equipped at its side, and at its opposite end with an exit opening 3. There is a slot 4 in the top of the casing 1, wherein slides vertically, a door 5 controlling the entrance opening 2. The numeral 6 marks a trigger adapted to engage beneath the door 5 when the latter is elevated as shown in Fig. 1, the trigger 6 being supplied at its rear end with an eye 7, and being provided intermediate its ends with an upstanding arm 8 connected with a transverse pivot member 9 mounted to rotate in the sides of the casing 1.

A first platform 10, located relatively near to the opening 2, is pivotally supported intermediate its ends, as shown at 11, on the sides of the casing 1. Downward swinging movement of the rear end of the platform 10 is limited by a stop 12 on the bottom of the casing 1. Intermediate its ends, the first platform 10 is provided with a standard 14 having a transverse finger 15 projecting within the eye 7 of the trigger 6.

A second platform 16 is located to the rear of the first platform 10 and is pivotally supported intermediate its ends, as shown at 17 on the sides of the casing 1. The second platform 16 is of angular form, including an upwardly extended rear end as clearly shown in Fig. 1. The forward end of the second platform 16 may be counterweighted as indicated at 18, so as to cause the forward end of the platform to rest on a stop 19 carried by the bottom of the casing 1, the stop 19 being prolonged rearwardly and being upwardly extended to form a guard 20, located beneath the upwardly inclined rear end of the platform 16, and constituting means for preventing animals from finding their way beneath the platform 16, when the platform is tilted.

The numeral 21 denotes a third platform located to the rear of the second platform 16 and extended beneath the platform 16. The third platform 21 is pivotally supported, as indicated at 22, adjacent to its forward end, on the side walls of the casing 1. A lever 23 is located above the casing 21 and is fulcrumed, intermediate its ends, as shown at 24 on posts 25 carried by the casing 1 and upstanding therefrom. The rear end of the lever 23 is connected by a link 26 with the rear end of the platform 21, the link 26 being slidably mounted in the top of the casing 1. A pivotal connection between the link 26 and the rear end of the platform 21 is denoted by the numeral 27. A flexible element 29 forms a connection between the upper end of the door 5 and an extension 30 mounted on the forward end of the lever 23. A baffle 28 is secured to the rear end wall of the casing 1 and arches over the rear end of the platform 21. The operation of the structure as thus far described is as follows:—

The weight of the eye 7 causes the trigger 6 to swing forwardly, until the trigger engages beneath the door, 5, as shown in Fig. 1, in order to hold the door elevated. An animal enters the casing 1 by way of the opening 2 and treads on the first platform 10, the rear end thereof being depressed. The finger 15 on the standard 14 of the platform 10, coöperating with the eye 7, retracts the trigger 6, as shown in Fig. 2, the trigger being withdrawn from beneath the door 5. Thereupon, the door 5 falls to a closed position, and the animal is entrapped within the casing 1.

The animal proceeds from the platform 10 upon the second platform 16 and tilts the second platform 16 on its pivotal mounting 17. The second platform 16 engages the third platform 21 and swings the platform 21 downwardly on its pivotal mounting 22. When the rear end of the third platform 21 swings downwardly, the link 26 tilts the lever 23 on its fulcrum 24 and raises the forward end of the lever 23, the door 5 being raised, and the trigger 6 automatically engaging beneath the lower edge of the door 5, as shown in Fig. 1. As soon as the animal has left the platform 16 and has trodden upon the platform 21, the platform 16 tilts on its fulcrum 17, due to the presence of the counterweight 18, the rear end of the platform 16 being swung into the elevated position shown in Fig. 2 of the drawing. The platform 16, therefore, tends to prevent an animal standing on the depressed platform 21, from passing backwardly out of the casing 1, after the lever 23 has been tilted, by the action of the platform 21, to restore the door 5 to the raised position of Fig. 1.

It has been found, as a matter of practice, that a cunning animal, standing on the platform 21, when the latter is depressed, as shown in dotted line in Fig. 2, will reach upwardly and claw down the rear end of the platform 16, from the solid line position of Fig. 2, the animal then being free to leave the casing 1, because, it will be recalled, the door 5 has been raised to the position of Fig. 1. The foregoing being understood, it may be stated that one object of the invention is to prevent the rear end of the platform 16 from being clawed down as aforesaid. The mechanism for accomplishing this result will now be described.

A U-shaped housing 31 projects laterally from the casing 1 and is connected thereto. A slot 32 is fashioned in the side wall of the casing 1 within the contour of the housing 31. A detent 33, in the form of a particircular disk is located in the housing 31 and is mounted to swing on a pivot element 34 mounted at its ends in the side portions of the housing 31.

The detent 33 has an inclined edge 35. The detent is so shaped that it tends normally to swing on the pivot element 34 until the edge 35 projects into the casing 1, through the slot 32, beneath the platform 21, the upper extremity of the detent 33 being retracted out of the way of the second platform 16. A projection 36 on the side of the detent 33 limits the extent to which the edge 35 projects through the slot 32.

When the platform 21 swings downwardly when the animal treads thereon the platform 21 coöperates with the inclined edge 35 of the detent 33 and swing the detent 33 on its pivotal mounting 34 until the upper end of the detent extends beneath the inclined rear end of the platform 16. It will be obvious that while the animal is standing on the depressed platform 21, the animal cannot reach up and claw down the rear end of the platform 16, because downward movement of the rear end of the platform 16 is prevented positively by the upper end of the detent 33 which has been advanced through the opening 32, into the path of the platform 16. The animal leaves the casing 1 through the exit opening 3, and as soon as the animal steps off the platform 21 and passes through the opening 3, the parts are restored to the positions of Figs. 1 and 3, the detent 33 swinging beneath the platform 21 and the platform 21 being raised at its rear end, as shown in Fig. 1, owing to the fact that so much of the lever 23 as lies in front of the fulcrum 24, is heavier than that portion of the lever which lies to the rear of the fulcrum.

It has been pointed out hereinbefore that the animal leaves the casing 1 by way of the opening 3, the animal proceeding into a lateral extension, shown in Fig. 3 and forming one of the characteristic features of the present invention.

The extension, denoted by the numeral 37, is attached to the casing 1 and includes an upwardly inclined portion 38 having an approximately horizontal end 39, the bottom of the end member 39 being open, as shown at 40. An inner platform 41 is pivotally supported intermediate its ends, as shown at 42, from the side walls of the end member 39 and is located at the juncture between the parts 38 and 39 of the lateral extension 37. The platform 41 is counterweighted or otherwise constructed, as indicated at 44, so that the inner end of the said platform tends to rest on the bottom of the upwardly inclined portion 38 in alinement therewith. Downward swinging movement of the outer end of the platform 41 is limited by a stop 43 carried by the bottom portion of the end member 39 and located at one end of the opening 40. An outer platform 45 is located in the end member 39 and is pivotally supported as shown at 46 on the side walls of the said end member. The inner end of the platform 45 extends beneath the upper end of the platform 41. A slot 47 is fashioned in the outer end of the platform 45 and in the slot 47, a counterweight is adjustable. The counterweight may consist of a bolt 48 shiftable in the slot 47, the bolt carrying a nut 49 which, when tightened up against the platform 45 will hold the bolt 48 in any position to which it may have been adjusted in the slot 47. The function of the shiftable weight 48—49 is to maintain the outer platform 45 poised on the pivot element 46.

The animal, advancing through the opening 3, moves upwardly along the inclined portion 38 of the extension and passes upon the platform 41 without suspicion, because that platform is in alinement with the bottom of the part 38. The platform 41 ultimately tilts, under the weight of the animal, into the dotted line position of Fig. 3. The animal advances readily on the poised outer platform 45, because no opening is visible beneath the platform, and as soon as the animal overbalances the platform 45, the animal is dumped downwardly through the opening 40. In practical operation, the opening 40 is disposed above a receptacle of any kind, such as a jaw, a box, a water butt or the like.

Having thus described the invention, what is claimed is:—

In a device of the class described, a casing having an entrance; a door controlling the entrance; a trigger coöperating with the door to hold the door open; a first platform pivotally supported on the casing, the platform and the trigger having interengaged parts coacting to retract the trigger from the door; a third platform pivotally supported in the casing; means connected with the third platform and with the door for opening the door; a second platform pivotally supported in the casing between the first and third platforms, the second platform comprising an upwardly extended part forming a barrier preventing retreat from the third platform; and a detent on the casing, the detent being operated by the third platform, when the third platform is depressed, to engage the second platform and to prevent a depression of said upwardly extended part of the second platform.

In testimony that I claim the foregoing as my own, I have hereto affixed my signature in the presence of two witnesses.

JOSEPH FRITSCH.

Witnesses:
W. T. ODLIN,
A. H. BINGHAM.